Patented Apr. 7, 1931

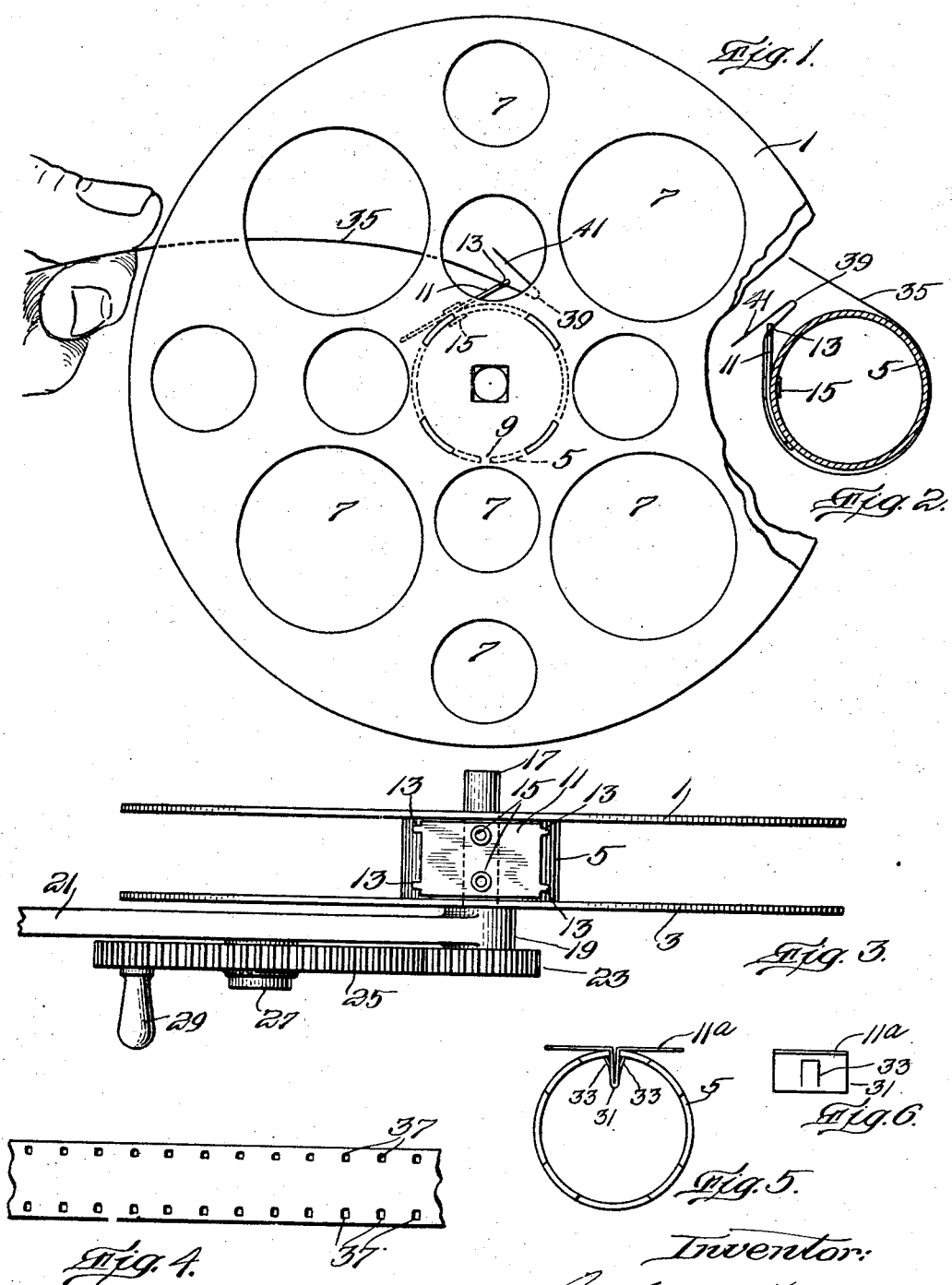

1,799,748

UNITED STATES PATENT OFFICE

ARTHUR C. HAYDEN, OF BROCKTON, MASSACHUSETTS

FILM REEL

Application filed October 3, 1927. Serial No. 223,501.

The invention to be hereinafter described relates to film reels for motion picture apparatus including cameras, projectors and any other device employing such reels.

The usual reel for these purposes comprises a pair of circular plates having a number of large and small circular holes therein and a shell-shaped hub between and connected to the plates.

Heretofore, it has been customary to attach the leading end of a film to the hub by grasping the end of the film with the fingers and inserting it into a slot in the hub. Then on rotation of the reel, the film will wrap around the hub and there will be a bend in the film adjacent the end thereof which will prevent the film from escape from the slot.

Another method of connecting the film to the hub is by means of a spring catch on the hub under which the film is inserted, the end of the film being previously folded so that it will engage the edge of the spring catch.

These methods of connecting the film end to the hub of the reel are inconvenient and objectionable for a number of reasons. The aim and purpose of the present invention, therefore, is to provide a reel with simple and effective means whereby the leading end of the film may be quickly and easily connected to the hub.

The character of the invention may be best understood by reference to the following description of good forms thereof shown in the accompanying drawing, wherein:

Fig. 1 is a side view of a reel provided with a film attaching device embodying the invention;

Fig. 2 is a section through the hub of the reel and showing the film attaching device thereon;

Fig. 3 is a plan of the reel and a means for rotating it.

Fig. 4 is a view of a portion of a film;

Fig. 5 is a section through the hub and shows a modified form of device for attaching the film to the hub; and Fig. 6 is an end view of the device shown in Fig. 5.

Referring to the drawing, the reel shown therein as one good form of the invention, comprises a pair of circular plates 1 and 3 connected by a shell-shaped hub 5, each of said plates having therein a number of large and small holes 7. The hub is formed of a strip of sheet metal bent to circular form with a slight space or slot 9 (Fig. 1) between the meeting ends thereof.

One good form of means for attaching the film to the hub comprises a leaf spring member 11 having a pair of spurs 13 at each end thereof, said spring being disposed tangentially to and secured to the hub intermediate the ends of the spring by eyelets 15. This spring member is very thin and may desirably have a thickness of three thousandths of an inch.

The reel may be applied to any suitable machine for rotating the same. In the present instance it is shown mounted on a spindle 17 journalled in a bearing 19 on a support 21, said spindle having a pinion 23 on an end thereof meshing with a gear 25 on a stub shaft 27 on the support, said gear being provided with a handle 29.

A modified form of the attaching device is shown in Figs. 5 and 6, and is similar to that already described, excepting that the leaf spring member 11a is formed with a reverse bend 31 having a pair of spring lugs 33 died out from the material of the reverse bend and tending to stand outward therefrom.

The construction is such that this attaching device may be quickly and easily applied to the ordinary film reel. To accomplish this, the device is presented to the hub, and the reverse bend 31 is pressed down through the space 9, referred to, in the hub. In so doing the spring lugs 33 will be pressed inward, and on emerging at the under side of the slot will snap outward and engage the inner surface of the hub and thereby secure the device to the hub.

When it is desired to attach a film to the hub of the reel, the leading end portion 35 (Fig. 1) may be introduced between the plates of the reel and allow to drop toward the hub. On rotation of the reel, the advancing spurs 13 will enter a pair of the usual sprocket feed holes 37 (Fig. 4) adjacent the edges of the film and the latter will wrap around the hub. In so doing it will flex the trailing end of the spring member down against the hub as indicated in Fig. 2, and then will flex the advancing end of the spring member down against the hub. Previous to presenting the leading end of the film to the hub, it is desirable, although not essential, to make a reverse bend 39 in said end having a portion 41 which may overlie the spurs which take hold of the film and prevent them from engaging the portion of the film wrapped over said spurs in the first convolution of the film about the hub.

By the provision of spurs at opposite ends of the attaching member, it will be obvious that the reel may be rotated in either direction in attaching the film thereto. When the film is unwound from and removed from the reel, the inherent resilience of the spring member will cause the same to assume a flat position in which the spurs stand out from the hub (Fig. 1) in readiness to catch and enter holes of the next film to be wound on the reel. When the last convolution of the film is unwound the outward spring of the member will flip the film off from the spurs and prevent tearing of the film. When the member is flexed down against the hub the spurs are withdrawn from film attaching position and will not enter holes in the film.

A reel equipped with an attaching device such as either of those shown herein, may be described as a self-threading film reel, since the spurs of the device will automatically thread into the holes of the film and connect the film to the reel on presentation of the leading end portion of the film to the hub and rotation of the reel without further attention of the operator.

The attaching device is extremely simple and cheap in construction, and useful in operation. It is a decided improvement upon devices hitherto known to me and employed for connecting the film to the reel.

It will be understood that the invention is not limited to the specific forms shown, and that various deviations may be made therefrom without departing from the spirit and scope of the appended claims.

What is claimed is:

1. A film reel for motion picture apparatus comprising a pair of plates, a hub between the plates adapted to have a film wound thereon, and a spring member located tangentially on the hub and secured thereto, said spring member having a free end with a pair of spurs thereon adapted to enter feed holes in the film, the free end of said member normally being a substantial distance from the hub to facilitate the spurs catching into holes of the film when the film is dropped between the plates toward the hub.

2. A film reel for motion picture apparatus comprising a pair of plates, a hub between the plates adapted to have a film wound thereon, and a leaf spring member secured to the hub and having a free portion tending to stand away from the hub and provided with a spur adapted to enter a sprocket feed hole in the film, said portion being adapted to flex toward the hub when the film is wound thereon.

3. A film reel for motion picture apparatus comprising a pair of plates, a hub between the plates adapted to have a film wound thereon, and a leaf spring on the hub and attached thereto with a free end having spurs adapted to enter feed holes of the film, said spring tending to hold the spurs away from the hub, and adapted to flex to the hub when the film is wound thereon.

4. A film reel for motion picture apparatus comprising a pair of plates, a hub between the plates adapted to have a film wound thereon, a leaf spring member secured between its ends to the hub and having spurs at opposite ends thereof adapted to enter feed holes of a film, said spring tending to assume a flat position tangentially to the hub, and free to flex toward the hub when the film is wound thereon.

5. A film reel for motion picture apparatus comprising a pair of plates, a hollow hub between the plates having a slot therein, and a leaf spring member having an element entered through said slot with a part adapted to snap out automatically when the element has entered the slot and engage the inner surface of the hub to secure the leaf spring member to the hub, said member having spurs adapted to enter sprocket holes in a film to connect the film with the hub.

ARTHUR C. HAYDEN.